US009092329B2

(12) United States Patent
Stoyanov

(10) Patent No.: US 9,092,329 B2
(45) Date of Patent: Jul. 28, 2015

(54) PROCESS INTEGRATION ALERTING FOR BUSINESS PROCESS MANAGEMENT

(75) Inventor: Tihomir Stoyanov, Sofia (BG)

(73) Assignee: SAP SE, Walldorf (DE)

( * ) Notice: Subject to any disclaimer, the term of this patent is extended or adjusted under 35 U.S.C. 154(b) by 135 days.

(21) Appl. No.: 13/333,660

(22) Filed: Dec. 21, 2011

(65) Prior Publication Data
US 2013/0166963 A1 Jun. 27, 2013

(51) Int. Cl.
G06F 11/00 (2006.01)
G06F 11/07 (2006.01)

(52) U.S. Cl.
CPC ........ *G06F 11/0709* (2013.01); *G06F 11/0784* (2013.01)

(58) Field of Classification Search
USPC .................. 714/37, 47.1, 25, 48, 39, 38.1
See application file for complete search history.

(56) References Cited

U.S. PATENT DOCUMENTS

| 8,056,091 | B2 | 11/2011 | Brunswig et al. | |
|---|---|---|---|---|
| 2010/0281307 | A1* | 11/2010 | Ng | 714/40 |
| 2010/0325493 | A1* | 12/2010 | Morimura et al. | 714/39 |
| 2011/0060944 | A1* | 3/2011 | Kawamura et al. | 714/20 |
| 2011/0213753 | A1* | 9/2011 | Manmohan | 707/640 |
| 2011/0231707 | A1* | 9/2011 | Davenport et al. | 714/37 |
| 2012/0144251 | A1* | 6/2012 | Carey et al. | 714/57 |

* cited by examiner

Primary Examiner — Sarai Butler
(74) Attorney, Agent, or Firm — Fish & Richardson P.C.

(57) ABSTRACT

A computer implemented method may include identifying one or more business process runtime events received at an events queue of a process integration runtime component. One or more errors associated with the business process runtime events may be identified. The one or more errors may be evaluated based, at least in part, on one or more rules associated with the business process runtime event and configuration information associated with the process integration runtime component. The one or more rules may be associated with the business process runtime event and configuration information associated with the process integration runtime component having the same format. An alert for the one or more errors associated with the business process runtime event can be stored.

16 Claims, 5 Drawing Sheets

FIG. 4

PROCESS INTEGRATION ALERTING FOR BUSINESS PROCESS MANAGEMENT

TECHNICAL FIELD

This disclosure pertains to notifying failures of business process instance executions based on process integration (PI) component-based alerting solution.

BACKGROUND

BPM has no central configuration conception. The configuration aspects for BPM are available on the same physical system where the BPM runtime is deployed. This is in contrast to PI configuration conception, where the PI Directory is the central configuration repository for all PI components and this configuration is then distributed (and represented locally in a cache) to each PI component (cache update) after configuration activation.

SUMMARY

In certain embodiments, a computer implemented method may include identifying one or more business process runtime events received at an events queue of a process integration runtime component. One or more errors associated with the business process runtime events may be identified. The one or more errors may be evaluated based, at least in part, on one or more rules associated with the business process runtime event and configuration information associated with the process integration runtime component. The one or more rules may be associated with the business process runtime event and configuration information associated with the process integration runtime component having the same format. An alert for the one or more errors associated with the business process runtime event can be stored. In certain implementations of the embodiments, the format is a JavaScript object notation format.

In certain implementations of the embodiments, the one or more rules associated with the business process runtime event comprise alert rules defining configuration parameters for communicating the one or more errors to one or more consumers.

In certain implementations of the embodiments, the configuration information associated with the process integration runtime component is stored in a process integration directory.

In certain implementations of the embodiments, the configuration information associated with the process integration runtime component is enhanced with runtime specific alert rules for the one or more business processes. The enhanced configuration information associated with the process integration runtime component may be stored in a cached alert rules object.

In certain implementations of the embodiments, the one or more business processes and the process integration runtime component are run locally relative to one another.

In certain implementations of the embodiments, identifying the one or more errors associated with the business process runtime events comprises identifying one or more errors that are received in the same format as the configuration information associated with the process integration runtime component.

While generally described as computer implemented methods, some or all of the aspects may be software embodied on non-transient, tangible media that processes and transforms the respective data or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DESCRIPTION OF THE DRAWINGS

FIG. 4 is an example screenshot of a user interface for BPM-specific alerts configuration.

DETAILED DESCRIPTION

This disclosure pertains, in general, to how business process management (BPM) can be integrated into existing process integration (PI) alerting solution and benefit alert notifications when errors are happening during process execution. This document describes components and configuration tools to facilitate the integration of BPM alerts to a PI alerting solution. BPM may be installed on any PI (central/de-central) adapter engine. This disclosure contemplates, among other things, that the PI advanced adapter engine & BPM are on the same physical system (e.g., JAVA stack).

In general, a central configuration is stored in a PI directory for BPM alert rules, and some of the configuration aspects are later handled on local systems where BPM is deployed. BPM runtime will be executed locally with PI runtime components, the configuration of PI alerting can be enhanced with BPM specific alert rules for handling runtime erroneous events using the PI alerting solution. In the PI directory, an abstract BPM rule can be described, but the instantiation-side process and identification, and other BPM specifics, are configured at the local PI component where BPM is deployed. BPM runtime can push events in the PI alerting event queue with a corresponding JavaScript Object Notation (JSON) format. A local alert engine for PI is enhanced to be able to process those BPM specific events based on the existing rules from the PI Directory, which has been locally associated to particular BPM runtime process instances. An alert configurator actor can create, edit, and store configuration information, alert rules, in a PI Directory, which includes information about the PI components where BPM is deployed.

Separating BPM alert rule configuration to central and local locations maintains the contract with the alert consumer solutions alert inbox 122 on solution manager 120 (configuration part in PI Directory), while BPM-specific configuration, that could not be maintained in PI Directory, is done locally. The option of having a completely local configuration for BPM used by local alert engine is also contemplated, but may stay hidden from the alert inbox 122 on solution manager 120 because it is performing some grouping and aggregation steps based on the alert rules as defined in PI Directory.

Figure 1:
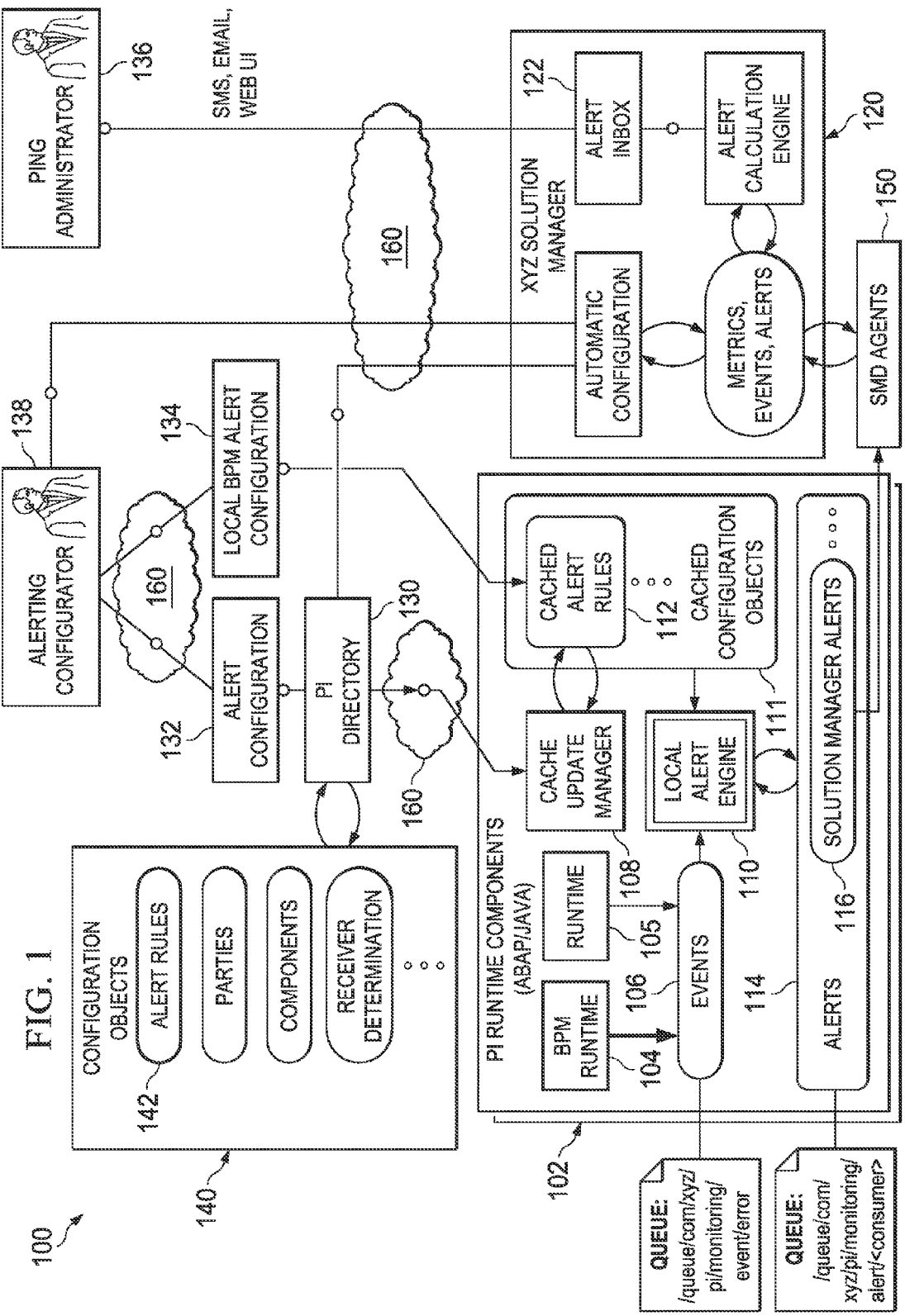
FIG. 1 is a schematic illustration of an example environment for BPM alerts integration with a PI alerting solution.

Turning to the illustrated example, FIG. 1 is a schematic illustration of an example environment 100 for BPM alerts integration with a PI alerting solution. The illustrated environment 100 includes, or is communicably coupled with, one or more PI runtime components 102, a solution manager server 120, one or more alerting configurators 138, and a PI directory 130. At least some of the components can communicate across or via network 160. In general, environment 100 depicts an example configuration of a system capable of facilitating integration of BPM runtime error alerts with a process integration alerts solution.

One or more PI runtime components 102 are executed at runtime. BPM runtime 104 is executing at runtime locally (e.g., the same physical system as) to the PI runtime component 102. The PI runtime component 102 may be implemented in JAVA and/or ABAP. The PI runtime component 102 is in communication with a PI directory 130, which is the central configuration storage for distributed PI runtime components, such as PI runtime component 102. PI directory 130 is a "central" storage that is accessible to PI runtime components across a network 160. PI directory 130 stores alert rules 142 associated with the PI component in a repository 140. The central configuration is distributed using the cache update manager 108, which stores the configuration information in the cached alert rules object 112, which is stored in conjunction with cached configuration objects 111. Cached alert rules object 112 includes a local representation of the information stored in the PI directory 130 for PI runtime component 102. Once registered into PI directory 130, PI runtime component 102 becomes a potential target for any configuration data distribution. Once configuration is activated in PI directory 130 it is distributed to all registered PI runtime components 102. There may exist a plurality of PI runtime components 102 associated with PI directory 130, and the PI directory 130 may store a plurality of configuration data. In the PI runtime component 102, the cache update manager 108 receives data relevant to that component, including alert rules 142 configured for that component. This data is stored in the cached alert rules object 112. In addition, local BPM configuration data is also stored in the cached alert rules object 112, and the local BPM information enhances information from PI directory 130 with BPM specific aspects. This cached information is then used by local alert engine 110 to evaluate BPM alerts in case a BPM error event is received in events queue 106.

BPM runtime 104 is running in the PI runtime component 102. BPM runtime 104 is represented with an arrow indicating that the BPM runtime events are stored in the events queue 106. BPM runtime 104 will push erroneous events into the event queue 106. BPM runtime 104 is updated so it can communicate with the events queue 106. Specifically, the BPM runtime 104 is enhanced to push JavaScript Object Notation (JSON) format events to the event queue 106 as part of its error handling activities.

Java Message Service (JMS) Queues are used to store events and alerts. The BPM runtime 104 includes one or more business applications running on the PI components. Business process instances run on the PI runtime component 102. There may occur erroneous situations, and an alert can be created for these erroneous situations. The local alert engine 110 for the PI runtime component 102 can be enhanced to cope with BPM specific information to evaluate and fire alerts for BPM erroneous situations. The BPM runtime 104 is run on the same physical system as the PI runtime component. The PI alerting mechanism is based, at least in part, on a central configuration stored on a centrally accessed PI directory 130. PI advanced adapter engine is a PI component that can be registered to and receives configuration data from the PI directory 130. BPM is deployed on the same physical system as the PI JAVA components, which is also known as the PI advanced adapter engine. PI advanced adapter engine is supporting different messaging protocols for PI. Each PI adapter engine has local alert engine 110 incorporated in order to evaluate alerts based on configuration data coming from PI directory 130.

The BPM runtime 104 reports erroneous events to the events queue 106. An example queue name is as follows:
/queue/com/sap/pi/monitoring/event/error/
As an example, the following events are supported for BPM scenario:
PROCESS_INSTANCE_FAILED: Process instance in Error state. This error can be the result of an internal error;
PROCESS_INSTANCE_FROZEN: Process Instance suspended. This error happens in response to failure to invoke a web service successfully
Other error and events are also contemplated. The BPM runtime 104 is instrumented in such a way as to publish the erroneous events on the same event queue 106 as the PI runtime 105. The events queue 106 acts as a storage for the runtime error events from both the BPM runtime 104 and the PI runtime 105.

Some aspects of BPM alerts, like process name, process ID, instance ID, and process status have no analogue in current JSON format of PI alerting and this requires extending it. Changes in existing JSON format for PI alerts would also lead to an extension of the alert inbox 122 on solution manager 120. Solution manager's alert inbox 122 aggregation contract might not be changed. That is because it is based on those parts of alert rule which are all part of a central configuration like component, error type, or rule identifier.

In general, because BPM configuration details are not exposed and maintained to any central repository, the configuration for BPM could not be completely done in PI directory 130, but are split on central and local configurations. The central configuration maintains those aspects that are representing the contract to the solution in the alert inbox 122. The local configuration will maintain the BPM specifics to allow the local alert engine 110 to evaluate alerts based on BPM error events.

Figure 2:
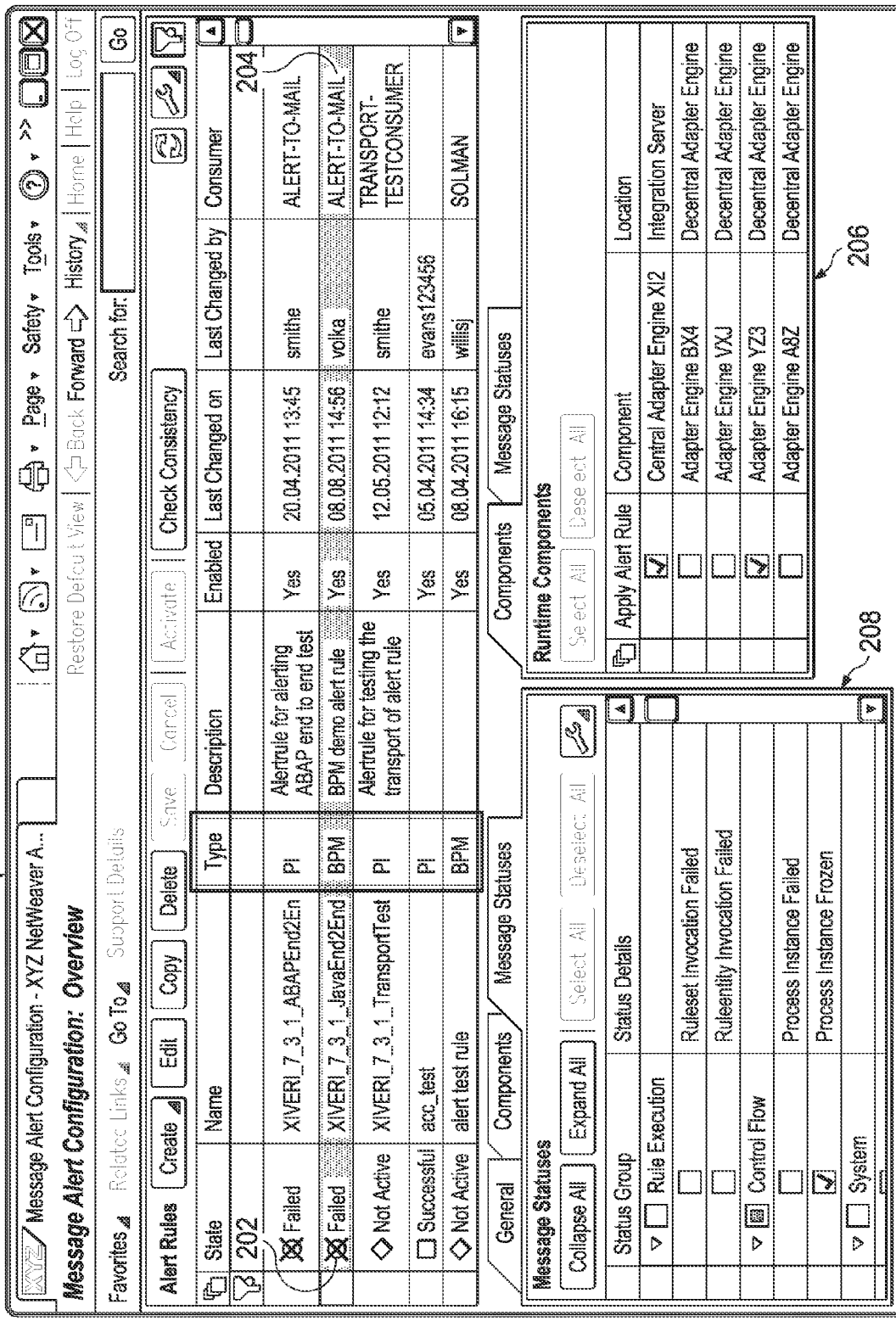
FIG. 2 is an example screenshot of a user interface tool for configuring an alert rule in the PI directory.
Figure 4:
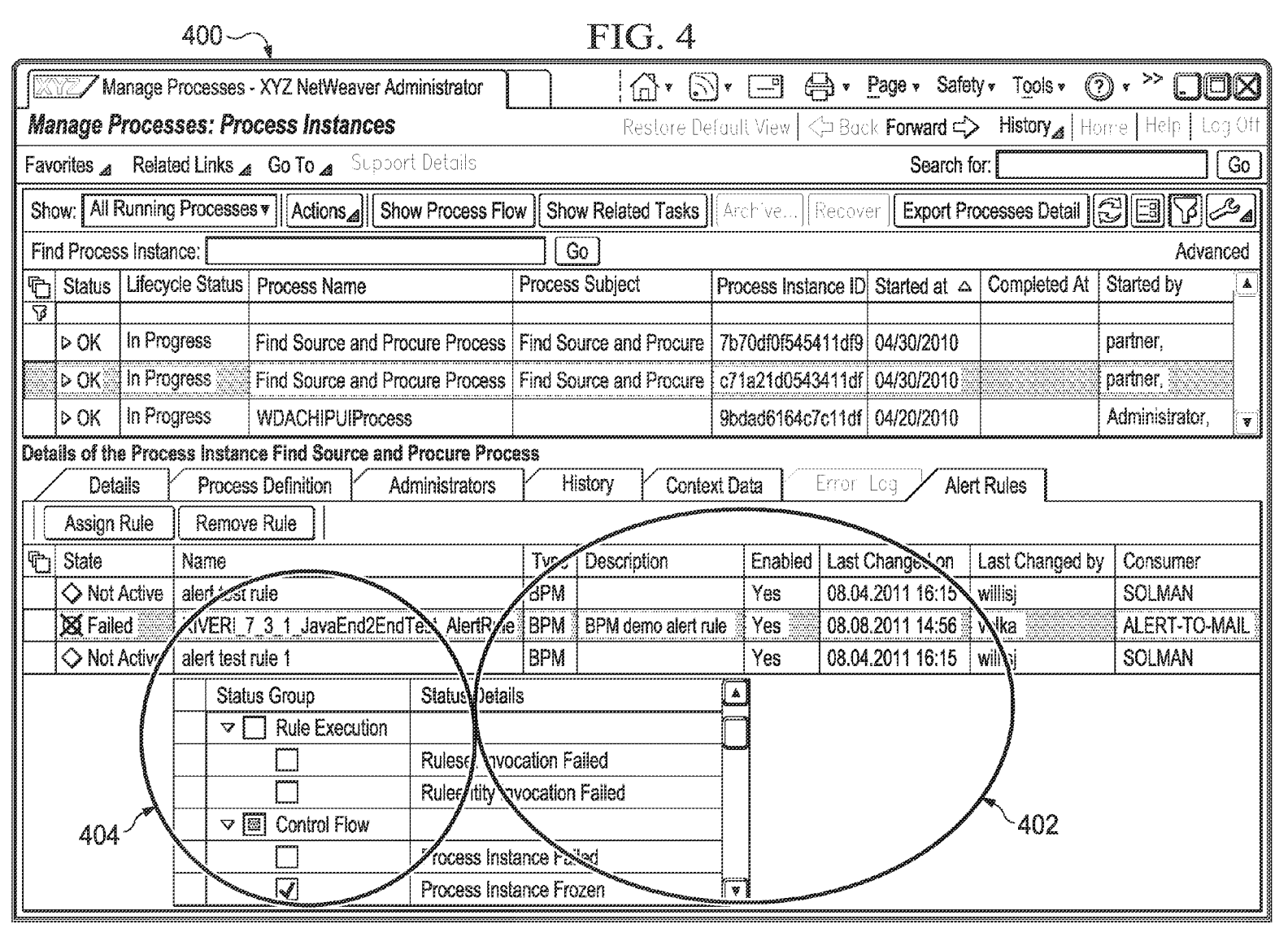

Alert rules 142 for BPM should be similar to other alert rules currently available in PI directory 130. An alerting configurator 138 can be a user or client system capable of modifying the configuration using an interface tool. Alerting configurator 138 has a UI (shown in FIG. 2), and accesses PI directory 130 and configures different aspects of the PI. Alerting configurator 138 can also configure alert rules 142 for PI alerting. Alerting configurator 138 is allowed to configure, modify, and create alert rules 142 in the PI directory 130. The BPM alert rules may be maintained in two phases by the alerting configurator 138: a central configuration phase, and a local configuration phase. FIG. 2 is an example screenshot 200 of a user interface tool for central configuration of alerts in the PI directory. FIG. 4 is an example screenshot 400 of a user interface tool for local configuration of BPM alerts, which is described later below. In FIG. 2, JAVA PI components are displayed for BPM alert rules. Alerting configurator 138 can apply those rules with BPM deployed so that the corresponding local alert engine 110 can evaluate the rule and alert BPM error events. BPM specifics are not maintained and stored in the PI directory 130, but rather are stored locally on the PI component where BPM is deployed. FIG. 2 shows an error state 202 for a deployed BPM, as well as where (to which consumer queue) to direct the alerts evaluated for the selected rule, which in this case is ALERT-TO-MAIL 204. PI runtime components 206 are also listed. A catalog 208 of potential erroneous situations can also be provided.

The central configuration for BPM alert rule includes the same general aspects as the one for PI alert rule. These general aspects maintained in PI directory are (as shown in FIG. 2): where errors might happen (Components' tab, 206), what kind of error (Message Status' tab, 208) and to where to distribute the alerts (Consumer' column, 204). 'Message Header Rules' tab is not applicable for BPM alert rule. The catalogue with possible errors 208 is different for BPM alert rule and PI alert rule. The association of BPM process to BPM alert rule will have to be done locally and is not part of the central configuration shown in FIG. 2. This is because PI Directory has no information about BPM processes. PI directory distributes configuration data to PI runtime components but not the other way around.

Returning to FIG. 1, alerting configurator 138 may use a local BPM alert configuration UI (shown on FIG. 4) on the system where BPM is deployed to configure BPM specifics of the rule (like process name, process id, process instance id, or process status). The local configuration UI for BPM alerts will have to only maintain the association between existing alert rule and BPM process instance.

Alerting configurator 138 may be a user or computing device operable to connect to or communicate with the PI directory 130 and the local BPM alert configuration 134 using a wireline or wireless connection, via the network 160, or another suitable communication means or channel. In some instances, the alerting configurator 138 may be a part of or associated with a business process involving one or more of the application systems, while in other instances, the alerting configurator 138 may be associated with an administrator. In general, each alerting configurator 138 includes a graphical user interface (GUI) 132 for configuring alerts in the PI directory 130 and a GUI 132 for configuring local BPM alerts. In general, alerting configurator 138 includes an electronic computer device operable to receive, transmit, process, and store any appropriate data associated with the environment 100 of FIG. 1. It will be understood that there may be any number of alerting configurators 138 associated with, or external to, environment 100. For example, while illustrated environment 100 includes a single alerting configurator 138, alternative implementations of environment 100 may include multiple configurators communicably coupled to the one or more of the systems illustrated. Additionally, there may also be one or more additional alerting configurators 138 external to the illustrated portion of environment 100 capable of interacting with the environment 100 via the network 160. Moreover, while each alerting configurator 138 is described in terms of being used by a single user, this disclosure contemplates that many users may use one computer, or that one user may use multiple computers.

The GUIs 132 associated with each alerting configurator 138 may include a graphical user interface operable to, for example, allow the user of an alerting configurator 138 to interface with at least a portion of the PI directory 130 and the local BPM alert configuration 134 and its associated operations and functionality, including the one or more dashboards. Generally, the GUIs provide the particular user with an efficient and user-friendly presentation of business data provided by or communicated within the system. The GUI 132 may comprise a plurality of customizable frames or views having interactive fields, pull-down lists, and buttons operated by the user. For example, the GUI 132 may provide interactive elements that allow a user to interact with the PI directory 130 or the local BPM alert configuration 134, as well as other components within and/or external to environment 100. The different portions of functionality provided by the PI directory 130 or local BPM alert configuration 134 may be presented and accessible to the user through a GUI 132. Generally, the GUI 132 may also provide general interactive elements that allow a user to access and utilize various services and functions of a particular configurator. Alerting configurator 138 may access and manipulate the PI directory 130, including as an administrator capable of modifying the operations and parameters associated with the alerts associated with one or more PI instances, as well as modifying the definitions and boundaries of a particular PI domain. A GUI 132 may present the information for viewing and interaction. In general, a GUI 132 is often configurable, supports a combination of tables and graphs (bar, line, pie, status dials, etc.), and is able to build real-time portals, where tabs are delineated by key characteristics (e.g., site or micro-site). Therefore, the GUI 132 contemplates any suitable graphical user interface, such as a combination of a generic web browser, intelligent engine, and command line interface (CLI) that processes information in the platform and efficiently presents the results to the user visually.

As used in this disclosure, each alerting configurator 138 is intended to encompass a personal computer, touch screen terminal, workstation, network computer, kiosk, wireless data port, smart phone, personal data assistant (PDA), one or more processors within these or other devices, or any other suitable processing device. For example, each alerting configurator 138 may comprise a computer that includes an input device, such as a keypad, touch screen, mouse, or other device that can accept user information, and an output device that conveys information associated with the configuration of one or more alerts, including digital data, visual information, or the GUI. Both the input and output device may include fixed or removable storage media such as a magnetic storage media, CD-ROM, or other suitable media, to both receive input from and provide output to users of alerting configurator 138 through the display, namely, the GUI 132.

The local BPM alert configuration 134 is stored on the cached alert rules 112 at the local PI runtime component 102. The local alert engine 110 uses BPM specific rules stored on the cached alert rules 112. This could be done in BPM local persistence layer which will be maintained via dedicated local configuration user interface. PI runtime component 102 uses the JSON format to represent an alert. Local alert engine 110 is extended to also evaluate BPM alerts based on BPM alert rules (the BPM alerts are enhanced with JSON formatted messages for alerting erroneous events). BPM runtime 104 will have to put events with extended JSON format in event queue (with only BPM relevant fields). For example:

```
{
"ErrCode":"!XI Alert Test errorcode",
"ErrCat":"!XI Alert Test errorcategory",
"ErrText":"! This is a test alert sent from the AdapterFramework on ",
"ProcessDefinitionName":"<Process Name>",
"ProcessDefinitionID":"<Process ID>",
"ProcessInstanceID":"<Process Instance ID>",
"ProcessStatus":"<Process Status>"
}
```

Local alert engine 110 will evaluate and distribute to corresponding consumer queue BPM alert (based on extended JSON format with BPM relevant fields only plus alert inbox 122 aggregation relevant fields):

```
{
"RuleId":"2a96d40eb1b711dfb2bbcc7c0a12caf1",
"Timestamp":"2010-01-30T13:15:30Z",
"Component":"af.y3y.lddby3y",
"ErrLabel":"1000",
```

-continued

```
"ErrCode":"!XI Alert Test errorcode",
"ErrCat":"!XI Alert Test errorcategory",
"ErrText":"! This is a test alert sent from the AdapterFramework on ",
"ProcessDefinitionName":"<Process Name>",
"ProcessDefinitionID":"<Process ID>",
"ProcessInstanceID":"<Process Instance ID>",
"ProcessStatus":"<Process Status>"
}
```

Local alert engine 110 will not use PI message header data to evaluate alerts, but rather will use BPM specific data coming from BPM local alert rule configuration.

Alerts are stored in the alerts queue 114 and may use the following example file name:
/queue/com/sap/pi/monitoring/alert/<consumer>
Each alert rule can be configured for each consumer to which the alert is distributed, and the consumer name may be reflected in the file name. In that sense, each consumer has a separate queue.

Figure 3:
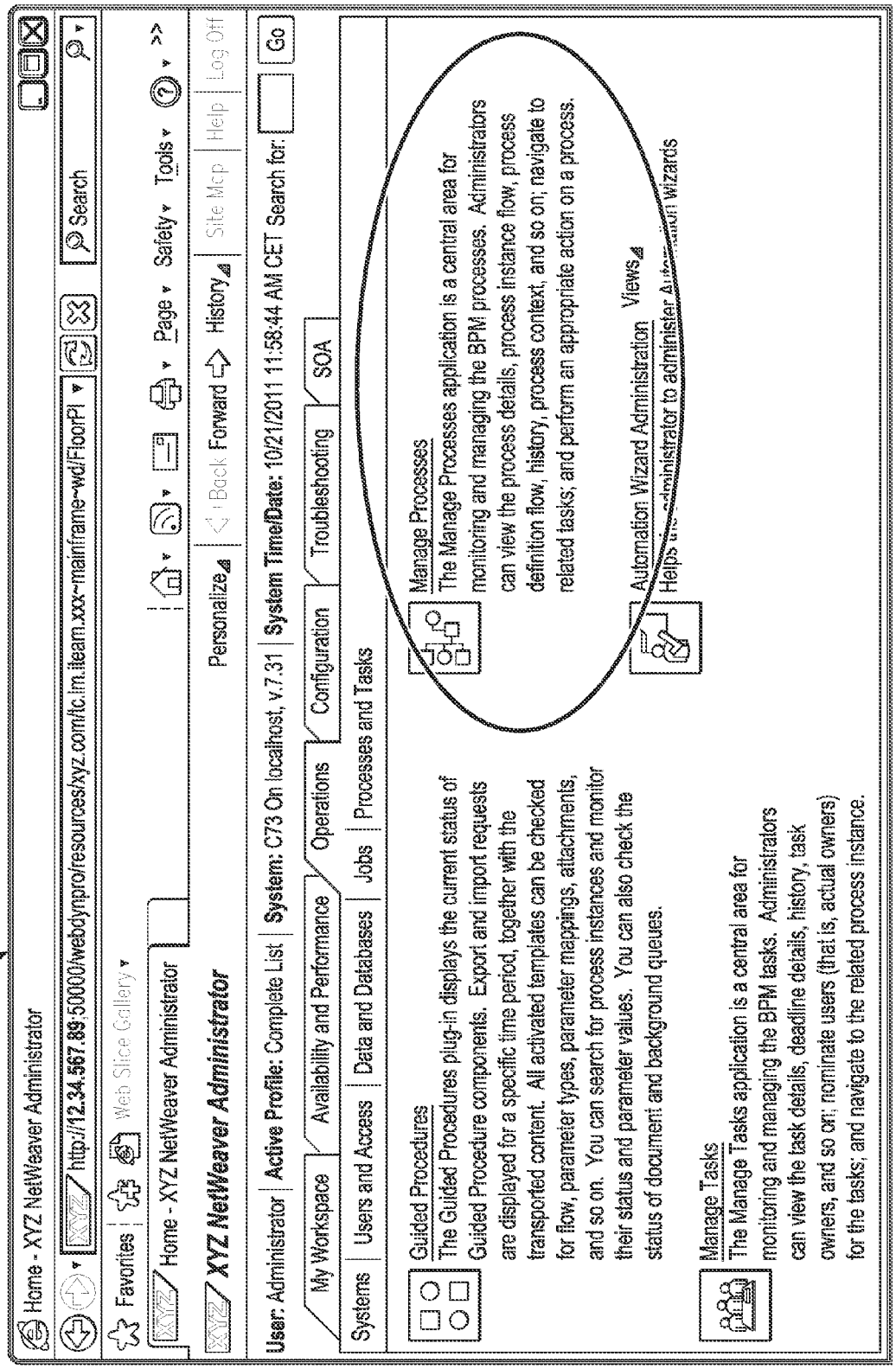
FIG. 3 is an example screenshot of a user interface for BPM specific configuration of alert rules.

Local BPM alert configuration 134 enhances the information from the PI directory 130 with BPM-specific aspects. The BPM runtime 104 is instrumented so that it publishes error events in the events queue 106. The local alert engine 110 will retrieve the events and evaluate them based on the alert rules. Local alert engine 110 has two inputs: the event from events queue 106 and the alert rule from the cached alert rules 112. Using these two things, local alert engine 110 evaluates the alert. The local alert engine 110 will distribute the alert to the queue for the consumer(s) identified in the alert rule. Local BPM alert configuration 134 shall add to already existing rules in PI directory 130, and BPM specifics, such as process ID, instance ID, process name, process status, consumer, etc., are maintained. Alert inbox 122 has aggregation fields, such as component, rule, error label, and consumer, which will still be part of PI directory 130 configuration for BPM alert rules. FIG. 3 is an example screenshot 300 of a UI for BPM specific configuration of alert rules.

FIG. 3 shows an example implementation UI in NetWeaver Administrator of a local configuration UI for BPM. FIG. 3 shows is an example location for incorporating local configuration aspects of BPM alert rules.

The UI could be incorporated into an existing NetWeaver Administrator embedded application for managing BPM processes. The system of FIG. 1 shows a PI Alerting solution architecture, where BPM pushes events in the event queue with corresponding JSON format, local alert engine has to be extended so that to be able to proceed those BPM specific events based on the existing rules from PI directory which has been locally associated to particular BPM process (instances). Alerting configurator 138 has to specify in PI directory 130 which PI components where BPM is deployed, as part of alert rule configuration.

The local alert rule configuration UI (shown in FIG. 4) may be run locally on the PI component where BPM is deployed. The UI is part of the BPM distribution, and may be part of the NetWeaver Administrator application. The UI allows the alerting configurator 138 for BPM-specific customization of alert rules. The UI uses its own persistence layer. The local alert engine on this component will recognize BPM events on the event queue 106 (by the JSON format), and apply BPM rules on them for evaluation of BPM alerts.

The alert rules are configured with notification options, erroneous situations, PI components, BPM runtime events, etc.

FIG. 4 is an example screenshot 400 of a user interface for BPM-specific alerts configuration. The association between a BPM process instance and an alert rule can be maintained and stored locally on BPM component where the corresponding local alert engine will consider it. Alert rules persist in the PI Directory, and details could be displayed in read only mode in dedicated Alert Rules tab 402. The alert rules tab 402 shows the BPM alert rules 404 also shown in the UI screenshot 200 of FIG. 2. The Alert Rules tab can be added to an existing configuration UI for BPM, as shown on FIG. 3, to associate alert rule to BPM process instance.

Returning to FIG. 1, solution manager 120 accesses the PI directory 130 to get information for PI runtime component 102. The solution manager 120 collects alerts from the PI runtime component 102 (by way of solution manager alerts 116), wherein each PI runtime component 102 is evaluating alerts locally. Configuration information for PI is retrieved. The solution manager 120 collects alerts from the PI runtime components 102 from local alerts queues, and shows them in one central place (e.g., the alert inbox 122). The solution manager 120 aggregates alerts based on aspects of the alerts.

With respect to that the mandatory fields in alert JSON representation (from aggregation and semantically grouping point of view) are "Component", "ErrLabel", "RuleId" and "ScenarioId" (brings IntegrationFlowID in case of Integration Flow scenario), these have to be prevented and always available for any kind of alert (including BPM one) and also shall be part of PI Directory configuration (from where Solution Manager retrieve information too). For example, if there are 200 alerts for component A based on alert rule B for erroneous situation C, alerts can be created, transmitted, and consumed without the solutions manager 120. The solution manager 120 collects alerts at a central place, stores them, and provides a central place where use cases can be searched or browsed. A PING administrator 136 can configure SMS or e-mail for notifications for the solution manager 120. Solution manager diagnostic (SMD) agent 150 is used by the solution manager 120 to connect to the alert storages (queues) and consume them, so the solution manager 120 can build its alert inbox 122. PING administrator 136 can configure the alert inbox 122. For example, PING administrator 136 may configure the notification parameters for the alert inbox 122. Alert inbox 122 allows for SMS, e-mail, and other types of notifications.

In the illustrated environment, the network 160 is depicted as a single network, but may be comprised of more than one network without departing from the scope of this disclosure, so long as at least a portion of the network 160 may facilitate communications between senders and recipients. The network 160 may be all or a portion of an enterprise or secured network, while in another instance, at least a portion of the network 160 may represent a connection to the Internet. In some instances, a portion of the network 160 may be a virtual private network (VPN). Further, all or a portion of the network 160 can comprise either a wireline or wireless link. Example wireless links may include 802.11 a/b/g/n, 802.20, WiMax, and/or any other appropriate wireless link. In other words, the network 160 encompasses any internal or external network, networks, sub-network, or combination thereof operable to facilitate communications between various computing components inside and outside the illustrated environment 100. The network 160 may communicate, for example, Internet Protocol (IP) packets, Frame Relay frames, Asynchronous Transfer Mode (ATM) cells, voice, video, data, and other suitable information between network addresses. The network 160 may also include one or more local area networks (LANs), radio access networks (RANs), metropolitan area networks (MANs), wide area networks (WANs), all or a portion of the Internet, and/or any other communication system or systems at one or more locations. The network 160, however, is not a required component in all implementations of the present disclosure.

The solution manager 120 may include one more processors, according to particular needs, desires, or particular embodiments of environment 100. The processor may be a central processing unit (CPU), a blade, an application specific integrated circuit (ASIC), a field-programmable gate array (FPGA), or another suitable component. Generally, the processor executes instructions and manipulates data to perform the operations of the solution manager 120 and, specifically, the functionality associated with the corresponding PI runtime component, PI directory, solution manager, and alert configurator. In one implementation, the server's processor executes the functionality required to receive and respond to requests and instructions from the one or more clients. Regardless of the particular implementation, "software" may include computer-readable instructions, firmware, wired or programmed hardware, or any combination thereof on a tangible and non-transitory medium operable when executed to perform at least the processes and operations described herein. Indeed, each software component may be fully or partially written or described in any appropriate computer language including C, C++, Java, Visual Basic, assembler, Perl, any suitable version of 4GL, as well as others. It will be understood that while portions of the software illustrated in FIG. 1 are shown as individual modules that implement the various features and functionality through various objects, methods, or other processes, the software may instead include a number of sub-modules, third-party services, components, libraries, and such, as appropriate. Conversely, the features and functionality of various components can be combined into single components, as appropriate. In some instances, a particular solution manager 120 may be associated with the execution of two or more PI runtime components.

One or more PI runtime components 102 are included in one or more PI domains. Each PI domain can be defined to include a set of PI runtime components 102 associated with one or more business components performing a particular task or set of tasks. The PI runtime components 102 included in a particular PI domain may be automatically associated with one another in some instances, or manually assigned in others. In some instances, the PI runtime components 102 in different PI domains may overlap, such that some PI runtime components 102 are included in different PI domains. Examples may include PI domains associated with related business processes where some of the PI runtime components 102 may be used in both situations (i.e., creating a purchase order and fulfilling a purchase order). A set of PI runtime components 102 is logically grouped into a PI domain based on the processes and operations being monitored. The PI runtime components 102 making up a particular PI domain can include various runtime components that monitor and capture message and event information during execution of a system and its business processes. Some PI runtime components 102 may be involved in message processing, while other PI runtime components 102 may be involved in other processing. Each PI runtime component 102 is executing or running on a technical system, such as a system executing ABAP-based programs and tools or a system executing Java-based programs and tools, including the application systems illustrated in FIG. 1. In some instances, more than one PI runtime component 102 may be running on a single technical system. Examples of PI components include adapter engines (e.g., adapter engine of application system A) and proxies (i.e., Java/ABAP proxy), although other components can also be used as PI components.

As used in the present disclosure, the term "computer" is intended to encompass any suitable processing device. For example, although FIG. 1 illustrates a single solution manager server 120, environment 100 can be implemented using any number of servers, as well as computers other than servers, including a server pool. Indeed, the solution manager 120 may be any computer or processing device such as, for example, a blade server, general-purpose personal computer (PC), Macintosh, workstation, UNIX-based workstation, or any other suitable device. In other words, the present disclosure contemplates computers other than general purpose computers, as well as computers without conventional operating systems. Further, the illustrated solution manager 120 may be adapted to execute any operating system, including Linux, UNIX, Windows, Mac OS, or any other suitable operating system. According to one implementation, the solution manager 120 may also include or be communicably coupled with a mail server. FIG. 1 depicts both a server-client environment, but could also represent a cloud computing network.

Figure 5:
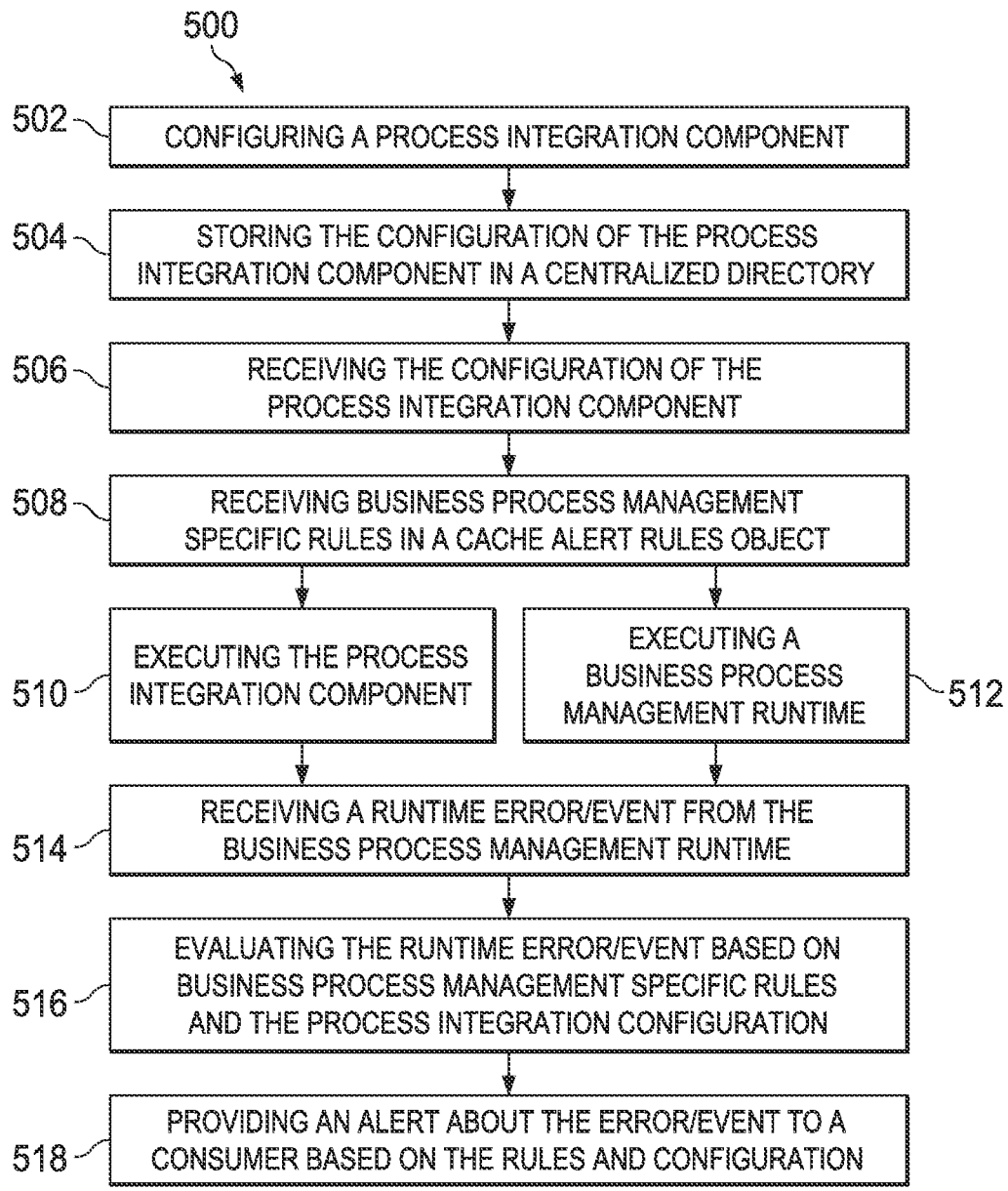
FIG. 5 is a process flow diagram for evaluating business process error events using process integration.

FIG. 5 is a process flow diagram 500 for evaluating business process error events using process integration (PI). A PI runtime component can be configured (502). The configuration can be stored in a PI directory accessible by one or more PI components at runtime across a network (504). The configuration of the PI runtime component can be received from the PI directory and stored in a cache (506). For the BPM runtime, one or more rules may be received and stored with the configuration information for the PI runtime component in the cache (508). The PI runtime component can be executed (510). A BPM runtime can be executed on the same physical system as the PI runtime component (512). The BPM runtime may send event messages using JSON format to an events queue (514). The PI runtime component interprets the JSON formatted message and evaluates the event from the BPM runtime based, at least in part, on the BPM rule and the PI runtime component configuration (516). An alert may be provided to one or more consumers based on the parameters set forth in the BPM rules (518).

The preceding figures and accompanying description illustrate example processes and computer implementable techniques. But environment 100 (or its software or other components) contemplates using, implementing, or executing any suitable technique for performing these and other tasks. It will be understood that these processes are for illustration purposes only and that the described or similar techniques may be performed at any appropriate time, including concurrently, individually, or in combination. In addition, many of the steps in these processes may take place simultaneously, concurrently, and/or in different orders than as shown. Moreover, environment 100 may use processes with additional steps, fewer steps, and/or different steps, so long as the methods remain appropriate. In other words, although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:
1. A computer implemented method comprising:
identifying one or more business process runtime events of a business process management business process runtime component received at an events queue of a process integration runtime component, wherein the business process runtime component and the process integration runtime component are run locally relative to one another on a particular physical system;

identifying one or more errors associated with the business process runtime events;

evaluating the one or more errors based, at least in part, on one or more centralized alert rules associated with the business process runtime event and configuration information associated with the process integration runtime component, wherein the configuration information associated with the process integration runtime component is stored in a process integration directory which is a central configuration storage for the process integration runtime component and other distributed process integration components and the process integration directory is separate from the particular physical system, wherein the one or more centralized alert rules associated with the business process runtime event and alert configuration information associated with the process integration runtime component having the same format, and wherein a local alert configuration is used to evaluate local alerts for the business process runtime component based on business process management error events; and storing an alert for the one or more errors associated with the business process runtime event.

2. The computer implemented method of claim 1, wherein the format is a JavaScript object notation format.

3. The computer implemented method of claim 1, wherein the one or more rules associated with the business process runtime event comprise alert rules defining configuration parameters for communicating the one or more errors to one or more consumers.

4. The computer implemented method of claim 1, wherein the configuration information associated with the process integration runtime component is enhanced with runtime specific alert rules for the one or more business processes.

5. The computer implemented method of claim 4, wherein the enhanced configuration information associated with the process integration runtime component are stored in a cached alert rules object.

6. The computer implemented method of claim 1, wherein identifying the one or more errors associated with the business process runtime events comprises identifying one or more errors that are received in the same format as the configuration information associated with the process integration runtime component.

7. A computer program product for integrating business process management error alerting with process integration alerting, the computer program product stored on a tangible, non-transitory media, operable to execute instructions comprising:

identifying one or more business process runtime events of a business process management business process runtime component received at an events queue of a process integration runtime component, wherein the business process runtime component and the process integration runtime component are run locally relative to one another on the same physical system;

identifying one or more errors associated with the business process runtime events;

evaluating the one or more errors based, at least in part, on one or more centralized alert rules associated with the business process runtime event and configuration information associated with the process integration runtime component, wherein the configuration information associated with the process integration runtime component is stored in a process integration directory which is a central configuration storage for the process integration runtime component and other distributed process integration components and the process integration directory is separate from the particular physical system, wherein the one or more centralized alert rules associated with the business process runtime event and alert configuration information associated with the process integration runtime component having the same format, and wherein a local alert configuration is used to evaluate local alerts for the business process runtime component based on business process management error events; and storing an alert for the one or more errors associated with the business process runtime event.

8. The computer program product of claim 7, further comprising:

receiving the configuration information associated with the process integration runtime component from a centralized process integration directory;

storing the configuration information in a cache; and receiving an update to the configuration information, the update including the one or more rules associated with the business process runtime event.

9. The computer program product of claim 7, wherein the format is a JavaScript object notation format.

10. The computer program product of claim 7, wherein the one or more rules associated with the business process runtime event comprise alert rules defining configuration parameters for communicating the one or more errors to one or more consumers.

11. The computer program product of claim 7, wherein the configuration information associated with the process integration runtime component is enhanced with runtime specific alert rules for the one or more business processes.

12. The computer program product of claim 11, wherein the enhanced configuration information associated with the process integration runtime component are stored in a cached alert rules object.

13. The computer program product of claim 7, wherein identifying the one or more errors associated with the business process runtime events comprises identifying one or more errors that are received in the same format as the configuration information associated with the process integration runtime component.

14. A system comprising:

one or more computers; and a computer-readable medium coupled to the one or more computers having instructions stored thereon which, when executed by the one or more computers, cause the one or more computers to perform operations comprising:

identifying one or more business process runtime events of a business process management business process runtime component received at an events queue of a process integration runtime component, wherein the business process runtime component and the process integration runtime component are run locally relative to one another on the same physical system;

identifying one or more errors associated with the business process runtime events;

evaluating the one or more errors based, at least in part, on one or more centralized alert rules associated with the business process runtime event and configuration information associated with the process integration runtime component, wherein the configuration information associated with the process integration runtime component is stored in a process integration directory which is a central configuration storage for the process integration runtime component and other distributed process integration components and the process integration directory is separate from the particular physical system, wherein the one or more centralized alert rules associated with the business process runtime event and alert configuration information associated with the process integration runtime component having the same format, and wherein a local alert configuration is used to evaluate local alerts for the business process runtime component based on business process management error events; and storing an alert for the one or more errors associated with the business process runtime event.

15. The system of claim 14, wherein the operations further comprise:

receiving the configuration information associated with the process integration runtime component from a centralized process integration directory;

storing the configuration information in a cache; and receiving an update to the configuration information, the update including the one or more rules associated with the business process runtime event.

16. The system of claim 14, wherein the format is a JavaScript object notation format.

* * * * *